R. F. GRANT & H. E. WETHERBEE.
FLEXIBLE COUPLING FOR DRIVING WHEELS.
APPLICATION FILED DEC. 30, 1911.
1,057,822.
Patented Apr. 1, 1913.
3 SHEETS—SHEET 1.
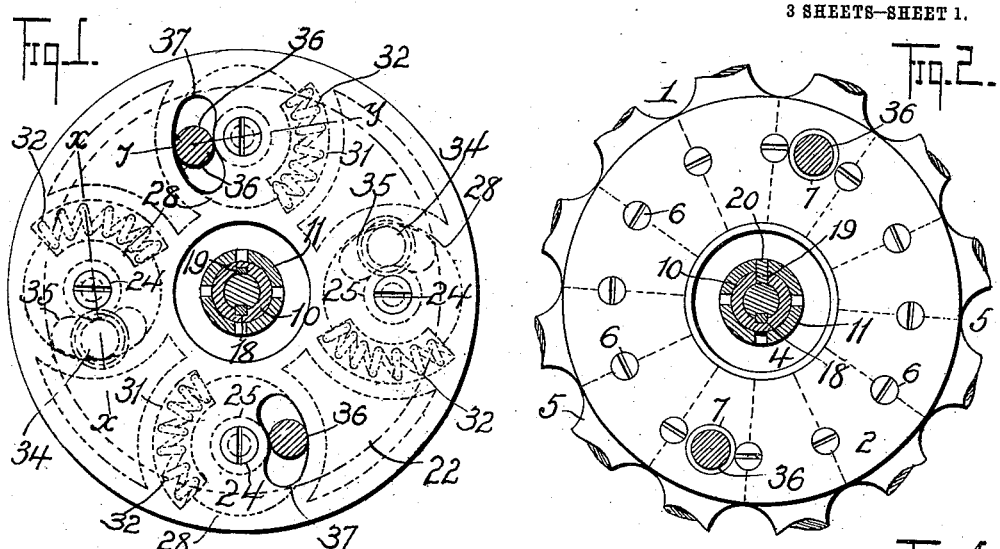
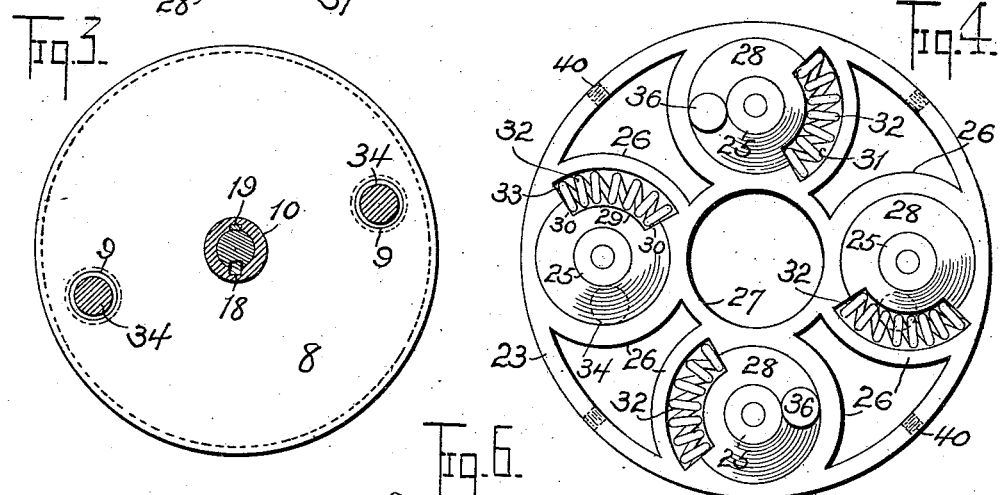
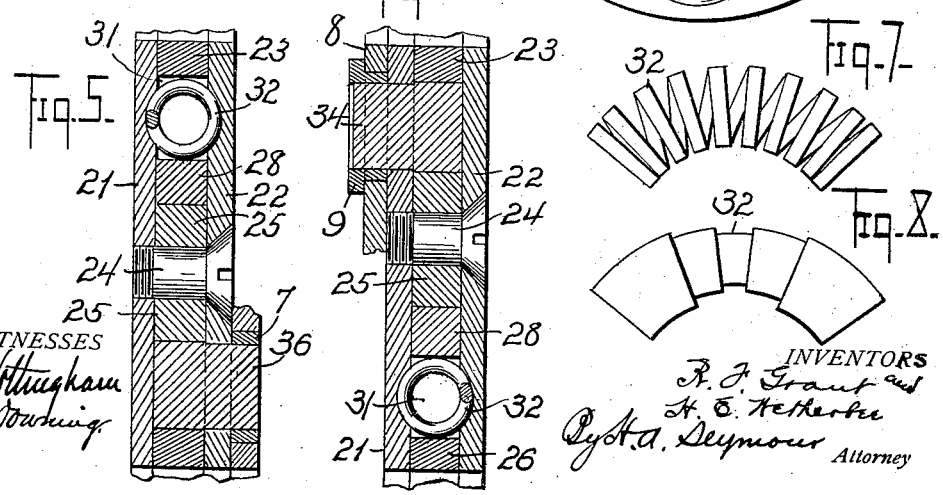
WITNESSES
INVENTORS
R. F. Grant and
H. E. Wetherbee
H. A. Seymour
Attorney

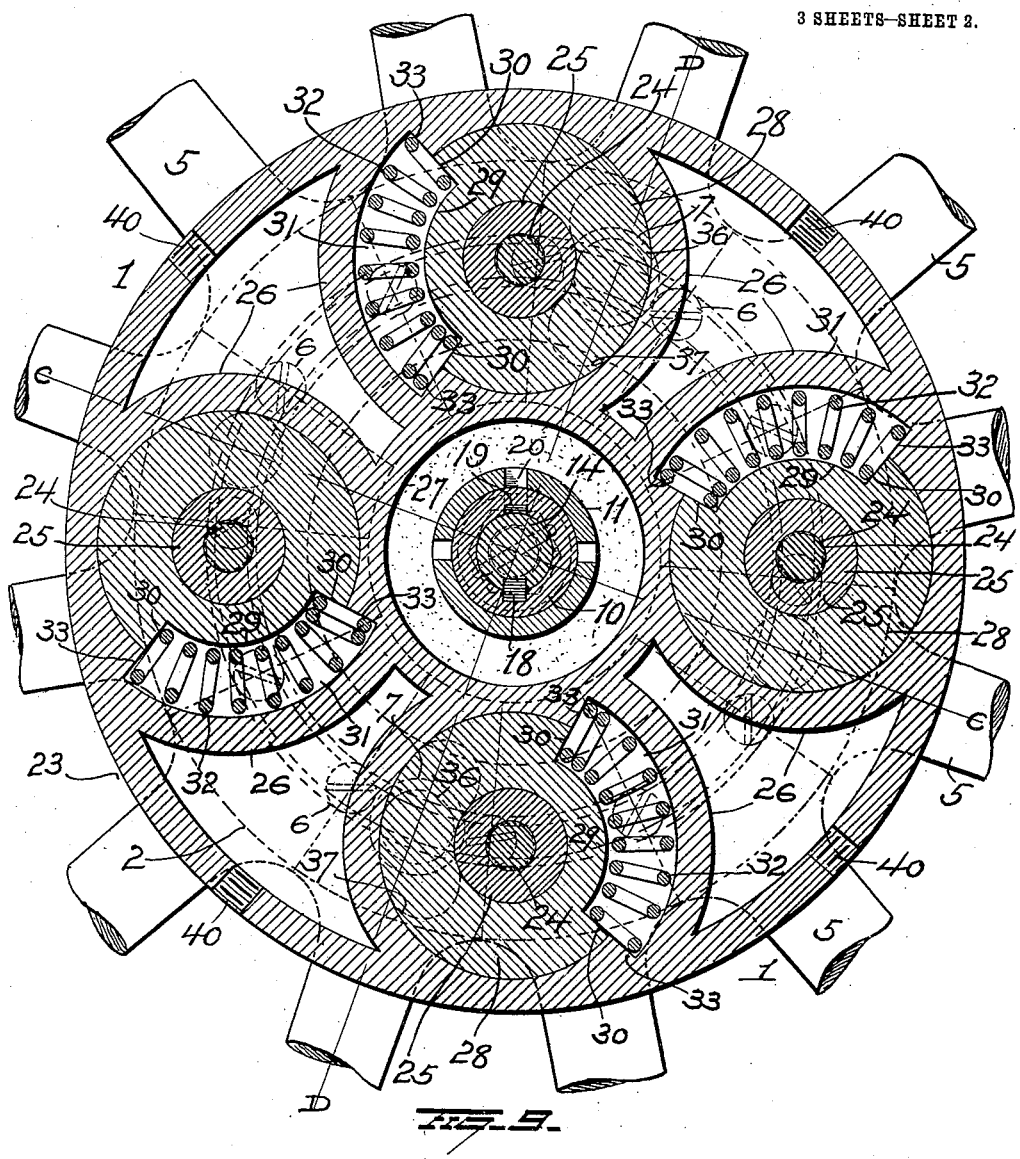

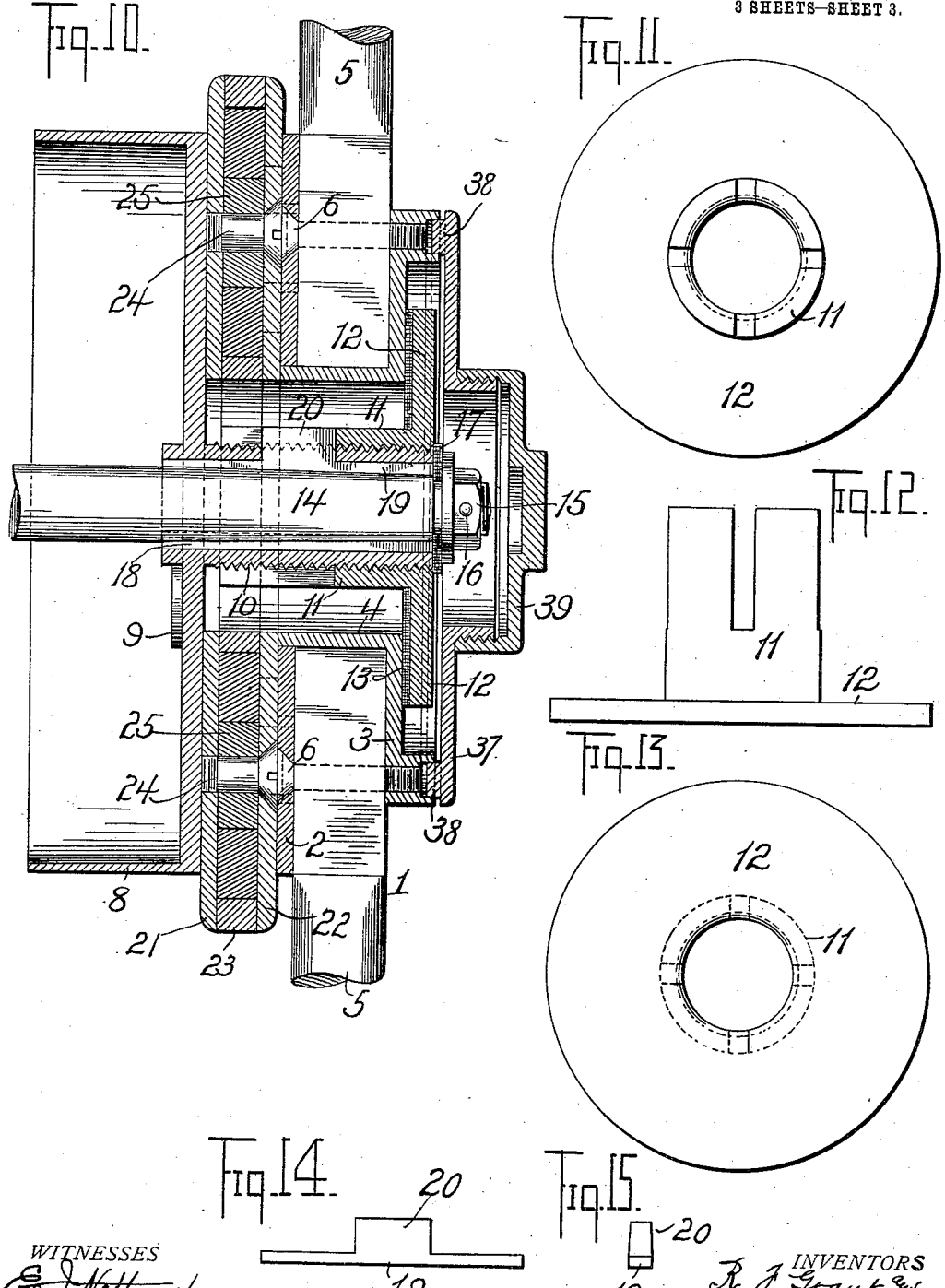

UNITED STATES PATENT OFFICE.

RICHARD F. GRANT AND HERBERT E. WETHERBEE, OF CLEVELAND, OHIO, ASSIGNORS OF ONE-THIRD TO HOWARD M. HANNA, JR., OF CLEVELAND, OHIO.

FLEXIBLE COUPLING FOR DRIVING-WHEELS.

1,057,822. Specification of Letters Patent. Patented Apr. 1, 1913.

Application filed December 30, 1911. Serial No. 668,801.

*To all whom it may concern:*

Be it known that we, RICHARD F. GRANT and HERBERT E. WETHERBEE, of Cleveland, in the county of Cuyahoga and State of Ohio, have invented certain new and useful Improvements in Flexible Couplings for Driving-Wheels; and we do hereby declare the following to be a full, clear, and exact description of the invention, such as will enable others skilled in the art to which it appertains to make and use the same.

Our invention relates to flexible and resilient coupling and driving means for wheels, the object being to obtain a flexible coupling, and resilient action, between the axle and wheel which will absorb all shocks sustained by and transmitted through the rim of the wheel.

A further object is to provide a strong and durable coupling that will be perfectly flexible in a plane perpendicular to the axis of the wheel.

With these ends in view our invention consists in transmitting motion from one member to another through an intermediate member having movement relative to each of the other members, the motion between the intermediate member and one member being at right angles to the motion between the intermediate member and the other member.

Our invention further consists in the parts and combination of parts as will be more fully described and pointed out in the claims:

In the accompanying drawings, Figure 1 is a view in side elevation of the coupling, the pins being in section and the eccentrics and springs in dotted lines. Fig. 2 is a view in elevation of the hub section of the wheel showing the pins in section. Fig. 3 is a similar view of the brake drum casting. Fig. 4 is a view in elevation of the body of the coupling showing the eccentrics and springs therein. Fig. 5 is a view on the line *x x* of Fig. 1. Fig. 6 is a view on the line *y y* of Fig. 1. Figs. 7 and 8 are views in elevation of modified forms of springs. Fig. 9 is an enlarged view in section taken through the central member of the coupling and showing the latter in its proper relation to the wheel. Fig. 10 is a view in transverse vertical section through the brake drum, coupling and wheel. Figs. 11, 12 and 13 are views of the member which locks the wheel and coupling to the brake drum, and Figs. 14 and 15 are views of the key which locks the locking member to the brake drum sleeve and axle.

1 represents a wheel, the hub of which is composed of two plates 2 and 3, the plate 3 having a centrally located cylindrical sleeve 4 which is of greater diameter than the parts inclosed or housed by the same, so as to permit of the necessary movements of the wheel on the axle and the axle within the wheel hub. The plate 2 is open at its center to receive the free end of sleeve 4, and the two plates thus constructed and assembled, form the hub to which the spokes 5 are secured by the screws 6, the latter also locking the two plates together on opposite sides of the spokes.

Secured to, or integral with the outer face of plate 2 are the hardened steel bushings 7, located as shown in Fig. 2 diametrically opposite each other, and at equal distances from the center of the hub, and secured to or formed integral with the outer face of the web or disk of the brake drum 8, are the hardened steel bushings 9. These bushings 9 are located diametrically opposite each other and at equal distances from the center of the brake drum 8, and when assembled normally rest at points intermediate the bushings 7 on the plate 2. The brake drum 8 is provided with a centrally located sleeve 10, which projects through the hub, as shown in Fig. 10, and which is externally threaded to be engaged by the internally threaded sleeve 11 of the member 12 which locks the brake drum to the hub. This locking member 12 is of considerably greater diameter than the diameter of the sleeve 4 which as before explained constitutes the bore of the hub, so as to keep the bore closed under all conditions, a washer 13 being interposed between the inner face of the locking member 12 and the outer face of plate 3 of the hub to receive the wear. Axle 14 passes through sleeve 10 of the brake drum, and of course through the hub of the wheel, and is locked therein by the nut 15 and cotter pin 16, a washer 17 being preferably interposed between the nut 15 and the free end of sleeve 10 for taking the wear. The axle 14 is held against rotation in sleeve 10 by the key 18, and the sleeves 10 and 11 are locked against independent rotation by the key 19 which latter, as shown in Figs. 1 and 2, is seated in a groove in sleeve 10 and has a fin 20 projecting through said sleeve and also through sleeve 11.

Located between the wheel and the brake drum is the coupling. This coupling, which is the medium of suspension between the axle and the wheel, and also the medium of connection whereby they rotate in unison, is composed of two side plates 21 and 22, and intermediate body 23 and eccentrics and springs carried by the latter, the two side plates and the intermediate body being rigidly connected by a series of screws 24 on which the hardened steel rollers 25 are mounted to rotate. The body 23 of the coupling consists of an outer ring inclosing a series of smaller rings 26 and 27, the latter being centrally located for the passage of the axle and sleeves 10 and 11, and is of appreciably greater diameter than the outer sleeve 11 so as to permit of free movement of the axle within the wheel, or movement of the wheel on the axle. The four rings 26 are arranged circumferentially around ring 27 with their centers about 90° apart, the spaces between the outer and inner rings forming oil reservoirs into which oil is introduced through any one of the openings 40 formed in the outer ring or body 23. The side plates 21 and 22 of the coupling, are secured to and close the opposite faces of the body 23 of the coupling, so that when the parts are assembled the rings and parts within the rings are wholly concealed. When the parts are assembled, the screws 24 which secure the side plates 21 and 22 to the body 23 of the coupling, will be located centrally within the outer rings 26 and support the rollers 25 concentric to the rings 26.

Centrally mounted on each roller 25 is a hardened steel disk, hereinafter called eccentric 28. Each eccentric 28 snugly fits within its inclosing ring 26, so as to have circumferential bearing therein, and each is cut away at its periphery, as at 29, to form shoulders 30. The wall of each ring 26 is also cut away as at 31, the cut away portions of the eccentrics and the rings forming seats for the springs 32, which may be round coiled springs, as in Figs. 1, 4, 5, 6 and 9, or they may be square in cross section as in Fig. 7, or they may be made of flat metal as in Fig. 8. These springs bear at their ends against the shoulders 30 formed on the eccentrics, and against the shoulders 33 formed in the rings 26 and yieldingly or flexibly restrain the eccentrics 28 against rotation on their axes. The springs are similarly located with respect to their rings and eccentrics, and are equal distances from each other, so that at least two of said springs are always sustaining the weight of the load borne by the wheel.

Two eccentrics located opposite each other are provided with hardened steel pins 34 which project laterally through elongated curved slots 35 in side plate 21, and rest in and are supported by the steel bushings or bearings 9 in the brake drum 8, while the remaining two oppositely disposed eccentrics, are each provided with a similar pin 36, which pass through elongated curved slots 37 in the side plate 22 of the coupling, and have bearing in the steel bushings 7, carried by the plate 2, which as before explained forms a part of the wheel hub. These pins 34 and 36 constitute the suspension means between the brake drum which is fixed to the axle, and the wheel, ample clearance being provided between the wheel and the axle for the free movement of each of these parts relatively to the other. The outer face of the hub is closed by cover plate 37 having an inwardly projecting circular rib 38, which fits and rests within a groove formed in the outer face of the flange on plate 3, and may be locked thereto by screws or any other approved means, and the end of the axle is covered and protected by the removable cap 39 screwed to the cover plate 37 as clearly shown in Fig. 10.

The drawings show our improvements connected up with the brake drum and rear wheel of an automobile, whereby the driving movement will be transmitted from the axle to the wheel, but the same coupling, with the brake drum eliminated, may be used on a front wheel, and may also be used on any vehicle, or on any wheel or revolving part where a yielding tire is employed or where a flexible coupling is required. The turning movement of the axle, in cases where the power is transmitted through the axle, is first conveyed to the brake-drum casting and from the latter to the two oppositely disposed eccentrics that are connected with the brake drum, and thence from the coupling through the two other eccentrics, to the wheel. The springs are of sufficient strength, under normal conditions to hold the wheel on its center when standing still. The turning movement imparted through the axle, will tend to drive through a circumference, (of which the center of the axle is the center) which passes through the center of each of the four eccentric pins 34 and 36 when in the position shown in Fig. 9. The power of the car will tend to hold the eccentric pins within this circumference, and any shock which displaces the eccentrics from the position shown in Fig. 9, will operate against the turning movement. In other words, under normal conditions the brake drum, axle and wheel are all on the same center, and all shocks to the rim of the wheel are absorbed by driving them off this common center, through the turning movement of the eccentrics against the power of the car and also against the power of the springs. As soon as the shock ceases, the parts all again resume a common center through the action of the several forces. The eccentric pins 34 and 36 are so placed that they will never present a dead center to any shock to which the rim of the wheel may be subjected. The eccentrics are so arranged that one pair of them allow the intermediate member to move relative to the driving member along the line C—C. The other pair allow the driven member to move relative to the intermediate member along the line D—D, which is approximately at right angles to the line C—C. This action allows the driven member to move relative to the driving member along either of the lines C—C or D—D and by motion along both of these lines it allows the driven member to move relative to the driving member along any line intermediate of the lines C—C and D—D. The eccentrics not only turn on their axles, but each has a complete bearing surface throughout the greater part of its circumference, and also at its sides against the plates 21 and 22, and the springs are held in place and completely housed so that there can be no movement other than that caused by the turning movement of the eccentrics.

The device is strong and substantial, is neat in appearance and experiments have demonstrated that it performs every function of a pneumatic tire.

It is evident that many slight changes might be made in the relative arrangement of parts shown and described without departing from the spirit and scope of our invention, hence we would have it understood that we do not wish to confine ourselves to the exact construction and arrangement of parts shown and described, but Having fully described our invention what we claim as new and desire to secure by Letters-Patent, is:

1. In a flexible resilient coupling, the combination of a driving member, a driven member, an intermediate member, eccentrics forming a part of said intermediate member and forming the sole driving connection between said driving and driven member, and yielding controlling means for said eccentrics.

2. The combination of relatively movable driving and driven members, an intermediate member and spring controlled eccentrics constituting a part of said intermediate member and forming the sole driving connection between said driving and driven members.

3. The combination of relatively movable driving and driven members and a member flexibly coupling said driving and driven members, the said coupling member carrying movable eccentrics having connection with the driving member and movable eccentrics having connection with the driven member each of said eccentrics having yielding controlling means.

4. The combination of driving and driven members, the said members being relatively movable in parallel planes but restrained against lateral movement, and a coupling connecting same the said coupling carrying spring controlled suspension and driving members which connect it with the driving member, and also carrying spring controlled suspension and driving members which connect it with the driven member.

5. The combination of driving and driven members and a coupling connecting same, the said coupling having a pair of oppositely disposed spring controlled driving and suspension members connecting it with the driving member, and also a pair of oppositely disposed independently movable spring controlled driving and suspension members located in a plane between the members of the other pair and connecting the coupling with the driven member.

6. The combination of a driving member, a driven member, a coupling intermediate said members, the said coupling comprising a frame and two pairs of oppositely disposed spring controlled eccentrics mounted to turn in said frame, one pair of eccentrics being connected with the driving member and the other pair with the driven member, and means passing centrally through the coupling for securing the driving and driven members and the coupling together.

7. The combination of driving and driven members and a coupling connecting the same the said coupling comprising a frame and two pairs of oppositely disposed spring controlled eccentrics mounted in said frame, one pair of eccentrics being connected with the driving member and the other pair with the driven member.

8. The combination of a wheel the hub of which has an enlarged bore, an axle of less diameter than said bore, a driving member fixed to said axle and a coupling connecting said driving member and wheel, the said coupling having two pairs of oppositely disposed spring controlled eccentrics, one pair of which is connected with the driving member on the axle and the other with the wheel.

9. The combination of a driving member, a driven member and a coupling connecting the same, the said coupling comprising a frame carrying two pairs of spring controlled eccentrics having central and circumferential bearing in said frame, one pair of said eccentrics having connection with the driving member and the other pair having connection with the driven member.

10. The combination of a driving member, a driven member and a coupling connecting the same, the said coupling comprising a frame having a central opening and four circular bearings arranged equidistant around said central opening; and a spring controlled eccentric in each of said circular bearings, two of said eccentrics being connected with the driving member and the other two with the driven member.

11. The combination of a wheel having an enlarged opening through the hub, an axle of less diameter than the opening in the hub and passing through same, a driving member keyed to the axle and having a sleeve embracing that portion of the axle within the hub, a locking member bearing against the outer face of the hub and secured to the sleeve of the driving member, and a flexible suspension and driving coupling interposed in a vertical plane between the driving member and wheel and connected to both.

In testimony whereof, we have signed this specification in the presence of two subscribing witnesses.

RICHARD F. GRANT.
HERBERT E. WETHERBEE.

Witnesses:
SAM. W. FOLSOM,
PERRY A. CLOPPER.

Copies of this patent may be obtained for five cents each, by addressing the "Commissioner of Patents, Washington, D. C."